United States Patent
Pavon Sierra et al.

(10) Patent No.: US 9,080,042 B2
(45) Date of Patent: Jul. 14, 2015

(54) RUBBER BLEND WITH IMPROVED ROLLING RESISTANCE BEHAVIOR

(71) Applicant: Continental Reifen Deutschland GmbH, Hannover (DE)

(72) Inventors: Viktoria Pavon Sierra, Hannover (DE); Juergen Wagemann, Bad Salzdetfurth (DE); Casper Van de Pol, Sorsum (DE); Norbert Kendziorra, Garbsen (DE); Katharina Herzog, Harsum (DE); Carla Recker, Hannover (DE); Norbert Mueller, Nienhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 13/925,321

(22) Filed: Jun. 24, 2013

(65) Prior Publication Data

US 2013/0289197 A1    Oct. 31, 2013

Related U.S. Application Data

(63) Continuation of application No. PCT/EP2011/070325, filed on Nov. 17, 2011.

(30) Foreign Application Priority Data

Dec. 22, 2010    (DE) .......................... 10 2010 061 469

(51) Int. Cl.
  *C08L 9/06*    (2006.01)
  *B29D 29/00*   (2006.01)
  *B60C 1/00*    (2006.01)
  *C08K 3/36*    (2006.01)

(52) U.S. Cl.
  CPC . *C08L 9/06* (2013.01); *B29D 29/00* (2013.01); *B60C 1/0016* (2013.04); *C08K 3/36* (2013.01); *C08L 2207/324* (2013.01)

(58) Field of Classification Search
  CPC ....... C08L 9/06; C08L 2207/324; C08L 9/00; C08K 3/36; B60C 1/0016; B29D 29/00
  USPC ................................. 524/493, 526
  See application file for complete search history.

(56) References Cited

U.S. PATENT DOCUMENTS

| | | | |
|---|---|---|---|
| 4,471,093 A | 9/1984 | Furukawa et al. | |
| 5,432,232 A | 7/1995 | Hattori et al. | |
| 5,959,039 A | 9/1999 | Yokoyama et al. | |
| 5,965,661 A | 10/1999 | du Bois et al. | |
| 6,114,451 A | 9/2000 | Shoda et al. | |
| 6,242,523 B1 * | 6/2001 | Blok et al. | 524/495 |
| 6,437,205 B1 | 8/2002 | Miller et al. | |
| 6,453,960 B1 * | 9/2002 | Kondo et al. | 152/451 |
| 6,889,737 B2 * | 5/2005 | Weydert et al. | 152/525 |
| 6,984,706 B2 * | 1/2006 | Karato et al. | 526/335 |
| 8,173,741 B2 | 5/2012 | Steinhauser et al. | |
| 2004/0054065 A1 | 3/2004 | Zanzig et al. | |
| 2006/0167160 A1 | 7/2006 | Nakagawa et al. | |
| 2007/0293619 A1 | 12/2007 | Jacoby et al. | |
| 2009/0209699 A1 * | 8/2009 | Weinreich et al. | 524/572 |

FOREIGN PATENT DOCUMENTS

| | | | |
|---|---|---|---|
| DE | 102008026351 | * | 12/2009 |
| EP | 0 502 728 A1 | | 9/1992 |
| EP | 897952 A2 | * | 2/1999 |
| EP | 1398347 A1 | * | 3/2004 |
| EP | 1514901 A1 | * | 3/2005 |
| EP | 2 065 221 A1 | | 6/2009 |
| EP | 2065221 A1 | * | 6/2009 |

OTHER PUBLICATIONS

EP 2065221 A1 (2009), machine translation, EPO espacenet.*
DE 102008026351 A1 (2009), machine translation.*
Ricon® 130, Cray Valley, data sheet (2010).*
International Search Report dated Mar. 7, 2012 of international application PCT/EP2011/070325 on which this application is based.
"General Purpose Rubber-NipolR NS. Series—Products: ZEON", http://www.zeon.co.jp/business_e/enterprise/rubber/rubber_ns.html?, copyright Zeon Corporation, printed Apr. 22, 2014.

* cited by examiner

*Primary Examiner* — Susannah Chung
*Assistant Examiner* — Josephine Chang
(74) *Attorney, Agent, or Firm* — Walter Ottesen P.A.

(57) ABSTRACT

A rubber blend, particularly for pneumatic vehicle tires, harnesses, straps and hoses. The rubber blend includes at least one rubber blend A of a solid styrene-butadiene rubber with an average molecular weight $M_n$ of 100,000 to 5,000,000 g/mol and a liquid butadiene rubber with an average molecular weight $M_n$ of 500 to 9000 g/mol, wherein the styrene-butadiene rubber is solution-polymerized or emulsion-polymerized, as well as 30 to 300 phr of at least one silicic acid and further blend components.

5 Claims, No Drawings

RUBBER BLEND WITH IMPROVED ROLLING RESISTANCE BEHAVIOR

CROSS REFERENCE TO RELATED APPLICATIONS

This application is a continuation application of international patent application PCT/EP2011/070325, filed Nov. 17, 2011, designating the United States and claiming priority from German application 10 2010 061 469.6, filed Dec. 22, 2010, and the entire content of both applications is incorporated herein by reference.

FIELD OF THE INVENTION

The invention relates to a rubber mixture, in particular for pneumatic tires, hoses, drive belts, and other belts.

BACKGROUND OF THE INVENTION

The composition of the rubber in the tread is a major determinant of the running properties of a tire, in particular of a pneumatic tire. Equally, the rubber mixtures used in hoses, drive belts, and other belts, especially in the locations subject to high mechanical load, are in essence responsible for the stability and durability of these rubber products. Very stringent requirements are therefore placed upon these rubber mixtures for pneumatic tires, hoses, drive belts, and other belts.

Partial or complete replacement of the carbon black filler by silica in rubber mixtures over a number of years has increased the overall level of, for example, the running properties of a tire. However, silica-containing tread mixtures still suffer from the known conflicts of objectives between inversely correlated tire properties: an improvement in wet grip and in dry braking generally continues to be attended by impairment of rolling resistance, of winter properties, and of abrasion performance. These properties are also an important criterion of quality in industrial rubber products, such as hoses, drive belts, and other belts.

A wide variety of approaches have already been used in attempts to resolve the conflicts of objectives: by way of example, a very wide variety of unmodified and modified polymers, plasticizers, and fine-particle fillers have been used for rubber mixtures, and attempts have been made to influence the properties of the vulcanisate by making modifications to the process for producing the mixture. Attempts are also being made to blend various polymers with one another, with the aim of improving the properties of the vulcanisate: an example is U.S. Pat. No. 4,471,093, which aims to resolve the conflict of objectives between rolling resistance and wet grip by disclosing a rubber mixture comprising a rubber blend made of a high-molecular-weight styrene-butadiene rubber with a low-molecular-weight butadiene rubber, and comprising natural rubber as further rubber, and comprising carbon black as sole filler. EP502728B1 in turn describes a rubber mixture which attempts to optimize the conflict of objectives between grip properties and abrasion: to this end, this rubber mixture comprises a blend of a high-molecular-weight styrene-butadiene rubber with a low-molecular-weight styrene-butadiene rubber, and comprises from 60 to 250 phr of carbon black as sole filler. U.S. Pat. No. 5,432,232 discloses rubber mixtures featuring improved abrasion, fracture properties, wet grip, ice grip, and dry grip. The rubber mixture described in U.S. Pat. No. 5,432,232 comprises a blend of a high-molecular-weight branched styrene-butadiene copolymer with a low-molecular-weight butadiene rubber, and comprises carbon black as sole filler component. U.S. Pat. No. 5,959,039 attempts to use a rubber blend of a high-molecular-weight styrene-butadiene rubber with a low-molecular-weight styrene-butadiene rubber to optimize flexibility at low temperatures, and equally to optimize grip properties on ice and snow. The rubber mixtures described in U.S. Pat. No. 5,959,039 comprise carbon black as sole filler component. U.S. Pat. No. 6,114,451 discloses rubber mixtures comprising a rubber blend of a high-molecular-weight butadiene rubber with a low-molecular-weight butadiene rubber, and 45 phr of carbon black as sole filler. This rubber mixture exhibits an improvement in respect of abrasion, of wet grip, and of ice grip.

U.S. Pat. No. 6,437,205 discloses that a rubber blend of a first low-molecular-weight polybutadiene with a second high-molecular-weight polybutadiene can be used to improve fracture properties, snow grip, wet grip, and rolling resistance.

The disclosures mentioned do not discuss, or at least do not adequately discuss, the conflict of objectives between rolling resistance, dry braking, and abrasion. Indeed, some of the rubber mixtures described in those specifications and comprising the respective rubber blends mentioned exhibited disadvantages in rolling resistance performance.

SUMMARY OF THE INVENTION

It is therefore now an object of the invention to provide a rubber mixture that is in particular intended for pneumatic tires, hoses, drive belts, and other belts, and which features an improvement of rolling resistance performance and of abrasion performance, without any significant simultaneous impairment of dry braking performance.

The object is achieved via a rubber mixture with the following composition:

at least one rubber blend A which is composed of a solid styrene-butadiene rubber with average molar mass $M_n$ of from 100 000 to 5 000 000 g/mol, where the styrene-butadiene rubber has been solution-polymerized or emulsion-polymerized, and of a liquid butadiene rubber with average molar mass $M_n$ of from 500 to 9000 g/mol, and from 30 to 300 phr of at least one silica, and further mixture constituents.

Surprisingly, it has been found that a rubber mixture containing silica and a rubber blend A, which is composed of a high-molecular-weight solution-polymerized or emulsion-polymerized styrene-butadiene rubber and of a low-molecular-weight butadiene rubber, features optimization of rolling resistance performance and of abrasion performance. Dry grip performance is simultaneously maintained at approximately the same high level.

The rubber mixture comprises, as essential rubber component, a rubber blend A of at least one rubber blend A which is composed of a solid styrene-butadiene rubber with average molar mass $M_n$ of from 100 000 to 5 000 000 g/mol, where the styrene-butadiene rubber has been solution-polymerized or emulsion-polymerized, and of a liquid butadiene rubber with average molar mass $M_n$ of from 500 to 9000 g/mol, and from 30 to 300 phr of at least one silica, and further mixture constituents.

Essential rubber component means in this context that the proportion of the higher-molecular-weight of the rubber blend, based in each case on the total amount of the high-molecular-weight, and therefore solid, rubbers, is preferably from 50 to 100 phr, particularly preferably from 60 to 100 phr.

The phr data (parts per hundred parts of rubber by weight) used in this specification are the conventional quantitative data used for mixture formulations in the rubber industry. The amount added in parts by weight of the individual substances in this specification is based on 100 parts by weight of the total mass of all of the high-molecular-weight, and therefore solid, rubbers present in the mixture.

All of the molecular weights used in this specification were determined by using gel permeation chromatography (GPC) in accordance with DIN 55672 1 or ISO 16564.

In one preferred embodiment, the styrene-butadiene rubber used has been functionalized.

The functionalization here is preferably achieved via hydroxy groups and/or epoxy groups and/or siloxane groups and/or amino groups and/or phthalocyanine groups and/or aminosiloxane groups and/or carboxy groups. However, it is also possible to use other functionalizations known to the person skilled in the art, another term used for these being modifications.

In one particularly preferred embodiment, the styrene-butadiene rubber used has from 0 to 50% by weight styrene content and/or from 6 to 80% by weight vinyl content.

The rubber mixture can also comprise at least one further polar or nonpolar rubber. The polar or nonpolar rubber here is one selected from the group consisting of natural polyisoprene and/or synthetic polyisoprene and/or butadiene rubber and/or styrene-butadiene rubber and/or solution-polymerized styrene-butadiene rubber and/or emulsion-polymerized styrene-butadiene rubber and/or liquid rubbers and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or isoprene-butadiene copolymer and/or hydrogenated styrene-butadiene rubber. Good results in respect of the object to be achieved can be achieved if the rubber mixture preferably also comprises at least one solid butadiene rubber with average molar mass $M_n$ of from 200 000 to 3 000 000 g/mol and with at least 80% by weight cis-content.

In particular, nitrile rubber, hydrogenated acrylonitrile-butadiene rubber, chloroprene rubber, butyl rubber, halobutyl rubber, and ethylene-propylene-diene rubber are used in the production of industrial rubber products, such as hoses, drive belts, and other belts.

Particular preference is equally given to the presence of at least one liquid butadiene rubber with average molar mass $M_n$ of from 500 to 9000 g/mol, preferably from 500 to 5000 g/mol, in the rubber mixture. Particularly good results for abrasion and rolling resistance are apparent here. In one particularly preferred embodiment, the proportion of the liquid butadiene rubber mentioned is from 5 to 50 phr, preferably from 5 to 35 phr, particularly preferably from 5 to 25 phr. It is equally advantageous that the liquid butadiene rubber with average molar mass $M_n$ of from 500 to 9000 g/mol, preferably from 500 to 5000 g/mol, has from 20 to 35% by weight vinyl content.

This liquid butadiene rubber is used as plasticizer in the rubber mixture.

The liquid butadiene rubber can be the same as, or different from, the liquid butadiene rubber of the rubber blend.

In one particularly preferred embodiment, the liquid butadiene rubber mentioned is the same as the liquid butadiene rubber of the rubber blend.

The rubber mixture can also comprise from 0 to 60 phr, preferably from 0.1 to 50 phr, preferably from 0.1 to 40 phr, of at least one further additional plasticizer. This further plasticizer is one selected from the group consisting of mineral oils and/or synthetic plasticizers and/or fatty acids and/or fatty acid derivatives and/or resins and/or factices and/or glycerides and/or terpenes and/or biomass-to-liquid oils (BTL oils), particular preference being given here to mineral oils. If mineral oil is used, this is preferably one selected from the group consisting of DAE (Distillated Aromatic Extracts) and/or RAE (Residual Aromatic Extract) and/or TDAE (Treated Distillated Aromatic Extracts) and/or MES (Mild Extracted Solvents) and/or naphthenic oils.

In one particularly preferred embodiment, however, the rubber mixture is free from further additional plasticizers of this type, that is, the proportion of the further additional plasticizers is 0 phr.

The rubber mixture of the invention comprises from 50 to 300 phr, preferably from 80 to 300 phr, particularly preferably from 80 to 200 phr, more particularly preferably from 90 to 150 phr, and in turn very particularly preferably from 90 to 100 phr, of silica. It is preferable that the silica involves what is known as a high-dispersibility silica with a CTAB surface area in accordance with ASTM D3765 of from 130 to 400 $m^2/g$, preferably from 150 to 300 $m^2/g$, particularly preferably from 150 to 300 $m^2/g$. BET surface area in accordance with DIN 66131 and DIN 66132 is preferably from 100 to 200 $m^2/g$. In combination with the liquid polymer used, and with the rubber blend A described, particularly good advantages are then apparent in respect of the object to be achieved.

The silicas used in the tire industry are generally precipitated silicas, which in particular are characterized in accordance with their surface area. Characterization is achieved here via the nitrogen surface area (BET) in accordance with DIN 66131 and DIN 66132, as a measure of the internal and external surface area of the filler in $m^2/g$, and the CTAB surface area in accordance with ASTM D3765, in $m^2/g$, as a measure of the external surface area, which is often considered to be the surface area that is active in relation to rubbers.

If a coupling agent is used, in the form of silane or of an organosilicon compound, the amount of the coupling agent is from 0.1 to 20 phr, preferably from 1 to 15 phr, particularly preferably from 1 to 10 phr. Coupling agents used here can be any of the coupling agents known to the person skilled in the art for use in rubber mixtures.

The rubber mixture of the invention can moreover preferably also comprise from 0.1 to 20 phr, preferably from 0.1 to 15 phr, particularly preferably from 0.1 to 10 phr, of at least one carbon black. Any of the carbon blacks known to the person skilled in the art can be used here. In one particularly preferred embodiment, the iodine number in accordance with ASTM D1510, also termed iodine adsorption number, of the carbon black is greater than or equal to 80 g/kg, and its DBP number is greater than or equal to 100 $cm^3/100$ g, preferably greater than or equal to 110 $cm^3/100$ g, particularly preferably greater than or equal to 115 $cm^3/100$ g. The DBP number in accordance with ASTM D2414 uses dibutyl phthalate to determine the specific absorption volume of a carbon black or of a pale-colored filler.

The use of this type of carbon black in the rubber mixture, in particular for pneumatic tires, reliably provides an optimum compromise between abrasion resistance and heat generation, which in turn influences the environmentally relevant property of rolling resistance. It is preferable here to use only one type of carbon black in the respective rubber mixture, but it is also possible to mix various types of carbon black into the rubber mixture.

The rubber mixture also comprises further additives. Further additives in essence include the crosslinking system (crosslinking agents, sulfur donors and/or elemental sulfur, accelerators, and retarders), antiozonants, antioxidants, mastication aids, processing aids, and other activators.

The quantitative proportion of the entire amount of further additives is from 3 to 150 phr, preferably from 3 to 100 phr, and particularly preferably from 5 to 80 phr.

The total quantitative proportion of the further additives also comprises from 0.1 to 10 phr, preferably from 0.2 to 8 phr, particularly preferably from 0.2 to 4 phr, of zinc oxide.

Zinc oxide is usually added as activator, mostly in combination with fatty acids (for example, stearic acid), to a rubber mixture for sulfur crosslinking with vulcanization accelerators. The sulfur is then activated via complexing for the vulcanization process. The BET surface area of the zinc oxide conventionally used here is generally less than 10 m$^2$/g. However, it is also possible to use what is known as nano zinc oxide with BET surface area from 10 to 60 m$^2$/g.

The rubber mixture is preferably vulcanized in the presence of elemental sulfur and/or of sulfur donors, and some sulfur donors here can simultaneously act as vulcanization accelerators. The amounts added of elemental sulfur and/or of sulfur donors in the final mixing step to the rubber mixture are those familiar to the person skilled in the art (from 0.1 to 9 phr, elemental sulfur preferably from 0 to 6 phr, particularly preferably from 0.1 to 3 phr). In order to control the vulcanization time required and/or the vulcanization temperature, and in order to improve the properties of the vulcanizate, the rubber mixture can comprise substances that influence the vulcanization process, for example vulcanization accelerators, vulcanization retarders, and vulcanization activators, as described above.

The rubber mixture disclosed herein is produced by the process conventionally used in the rubber industry, by first producing, in one or more mixing stages, a base mixture with all of the constituents other than the vulcanization system (sulfur and substances that influence the vulcanization process). The finished mixture is produced in a final mixing stage via addition of the vulcanization system. By way of example, an extrusion procedure is used to process the finished mixture further and to convert it to the appropriate form.

Another object of the invention is to use the rubber mixture described above for producing pneumatic tires, in particular for producing the tread of a tire and/or a body mixture of a tire, and for producing hoses, drive belts, and other belts.

The term body mixture here in essence includes side-wall, inner liner, apex, belt, shoulder, belt profile, squeegee, carcass, bead reinforcement, and/or a solid tire.

For the use in pneumatic tires, the mixture is preferably converted to the form of a tread, and applied in the known manner during the production of the green tire. However, the tread can also be wound in the form of a narrow strip of rubber mixture onto a green tire. If the tread has two parts (upper part: cap and lower part: base), the rubber mixture is preferably used as mixture for the cap.

The production process for the rubber mixture of the invention for the use as body mixture in tires proceeds as described above for the tread. The difference lies in the shaping after the extrusion procedure. The resultant forms of the rubber mixture of the invention for a body mixture or for a plurality of different body mixtures then serve for the construction of a green tire. For the use of the rubber mixture of the invention in drive belts and other belts, in particular in conveyor belts, the extruded mixture is converted to the appropriate form and, during this process or subsequently, it is frequently provided with reinforcement, for example, synthetic fibers or steel cords. This mostly gives a multilayer structure, composed of one or more layers of rubber mixture, one or more layers of the same or different reinforcement, and one or more further layers of the same and/or another rubber mixture.

For the use of the rubber mixture of the invention in hoses, preference is frequently given to peroxidic crosslinking rather than what is known as sulfur cross-linking. The hoses are produced by a method based on the process described in Handbuch der Kautschuktechnologie [Handbook of rubber technology], Dr. Gupta Verlag, 2001, chapter 13.4.

DESCRIPTION OF THE PREFERRED EMBODIMENTS OF THE INVENTION

The invention will now be explained in more detail by taking comparative and inventive examples, collated in Tables 1 and 2. The mixtures characterized by "I" here are mixtures of the invention, while the mixtures characterized by "C" involve comparative mixtures.

The experimental results collated in Table 2 were determined on 195/65 R15 tires with the ContiWinterContact TS830 tire profile. In each case here, the rubber mixture for the tread of the tire was produced by a method based on the compositions described in Table 1. All of the results have been stated in the form of relative evaluation based on 100% for the tire C1. Values above 100% are superior to the comparative tire C1 and represent an improvement.

ABS wet braking performance was determined via the braking distance from 80 km/h on a wet road.

ABS dry braking performance was determined via the braking distance from 100 km/h on a dry road.

Rolling resistance corresponds to the rolling resistance force measured at 90 km/h on the appropriate machine.

The abrasion values are the weight loss from the tire after 10 000 kilometers of rolling.

TABLE 1

| Constituent | Unit | C1 | C2 | C3 | I1 |
|---|---|---|---|---|---|
| BR[a] | phr | 40 | 40 | 40 | 40 |
| SSBR[b] | phr | — | 82.5 | — | — |
| SSBR[c] | phr | 60 | — | 60 | — |
| SSBR[d] | phr | — | — | — | 82.5 |
| N339 carbon black | phr | 9 | 9 | 9 | 9 |
| Silica[e] | phr | 90 | 90 | 90 | 90 |
| Silane[f] | phr | 6.5 | 6.5 | 6.5 | 6.5 |
| Plasticizer[g] | phr | 40 | 17.5 | — | — |
| Liquid polymer[h] | phr | — | — | 40 | 17.5 |
| ZnO | phr | 2 | 2 | 2 | 2 |
| Antioxidant/anti-ozonant/stearic acid | phr | 5 | 5 | 5 | 5 |
| Processing aid[j] | phr | 3 | 3 | 3 | 3 |
| DPG | phr | 2 | 2 | 2 | 2 |
| CBS | phr | 1.8 | 1.8 | 2.6 | 2.6 |
| Sulfur | phr | 1.5 | 1.5 | 2.1 | 2.1 |

[a]BR with cis-content greater than 80% by weight;
[b]BUNA VSL 5025-1, Lanxess, 50% by weight vinyl content, 25% by weight styrene content, extended with 27.3% by weight TDAE oil;
[c]BUNA VSL 5025-0, Lanxess, 50% by weight vinyl content, 25% by weight styrene content;
[d]BUNA VSL 5025-2a, Lanxess, 50% by weight vinyl content, 25% by weight styrene content, extended with 27.3% by weight liquid polybutadiene ($M_n$ = 2500 g/mol);
[e]Zeosil 1165 MP, Rhodia (BET 149 m$^2$/g, CTAB 154 m$^2$/g);
[f]TESPD Si261, Evonik;
[g]TDAE;
[h]liquid polybutadiene, $M_n$ = 2500 g/mol, Tg = −90° C., 28% by weight vinyl content, Ricon 130, Sartomer;
[j]Aktiplast TS, Rheinchemie.

TABLE 2

| Tire Property | C1 | C2 | C3 | I1 |
|---|---|---|---|---|
| ABS dry braking | 100 | 100 | 97 | 99 |
| ABS wet braking | 100 | 100 | 100 | 100 |
| Rolling resistance | 100 | 100 | 98 | 101 |
| Abrasion | 100 | 100 | 110 | 114 |

From Table 2 it is apparent that the use of a rubber blend A provides a marked improvement in respect of rolling resistance and abrasion, see I1. There is practically no resultant effect on dry braking performance. However, it can also be seen that these advantages are obtained only when a component of the rubber blend A is a liquid butadiene rubber. If a component of the rubber blend is a TDAE oil, see C2, advantages of this type are not apparent.

It is understood that the foregoing description is that of the preferred embodiments of the invention and that various changes and modifications may be made thereto without departing from the spirit and scope of the invention as defined in the appended claims.

What is claimed is:

1. A rubber mixture comprising:
    at least one rubber blend A which is composed of a solid solution-polymerized styrene-butadiene rubber with an average molar mass $M_n$ of from 100 000 to 5 000 000 g/mol, extended with a liquid butadiene rubber with an average molar mass $M_n$ of from 500 to 5000 g/mol;
    from 30 to 300 phr of at least one silica; and
    further mixture constituents;
    wherein the rubber mixture also comprises at least one further liquid butadiene rubber with average molar mass $M_n$ of from 500 to 9000 g/mol as plasticizer,
    wherein the rubber mixture is free from additional plasticizers,
    wherein the rubber mixture further comprises from 0.1 to 20 phr of carbon black,
    wherein a proportion of the solid rubber of the rubber blend A, based on a total amount of the solid rubber in the rubber mixture, is at least 60 phr, and
    wherein the rubber mixture also comprises at least one solid butadiene rubber having an average molar mass $M_n$ of from 200 000 to 3 000 000 g/mol and a cis-content of at least 80% by weight.

2. The rubber mixture as claimed in claim 1, wherein an amount of the at least one silica is from 50 to 300 phr.

3. A method of producing a tire comprising preparing the rubber mixture as claimed in claim 1.

4. The method as claimed in claim 3 for producing the tread or a body mixture of a tire.

5. A method of producing a hose, drive belt or a belt comprising preparing the rubber mixture as claimed in claim 1.

* * * * *